April 6, 1954 P. A. NOXON 2,674,423
AUTOMATIC PILOT
Filed Dec. 31, 1943 4 Sheets-Sheet 3
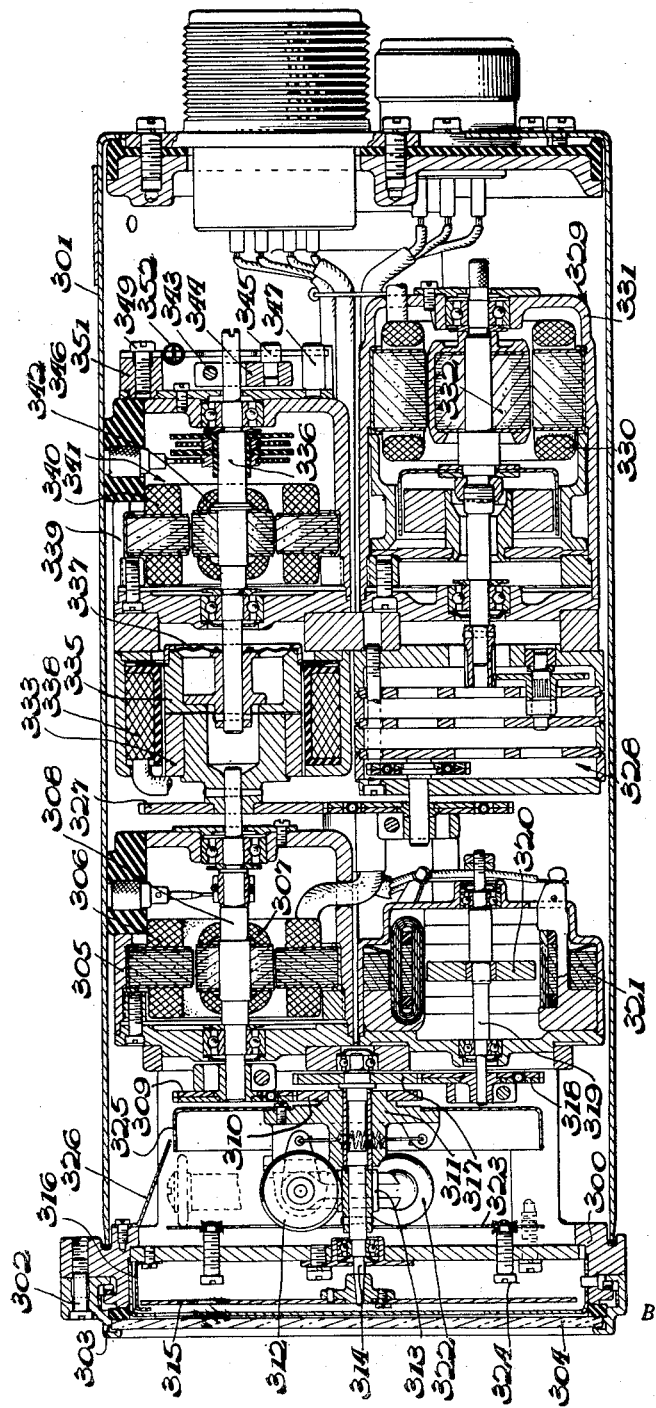
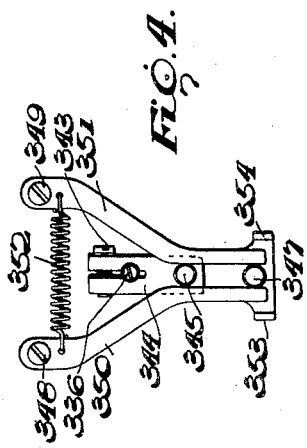
INVENTOR.
Paul A. Noxon
BY
ATTORNEY April 6, 1954  P. A. NOXON  2,674,423
AUTOMATIC PILOT Filed Dec. 31, 1943  4 Sheets-Sheet 4

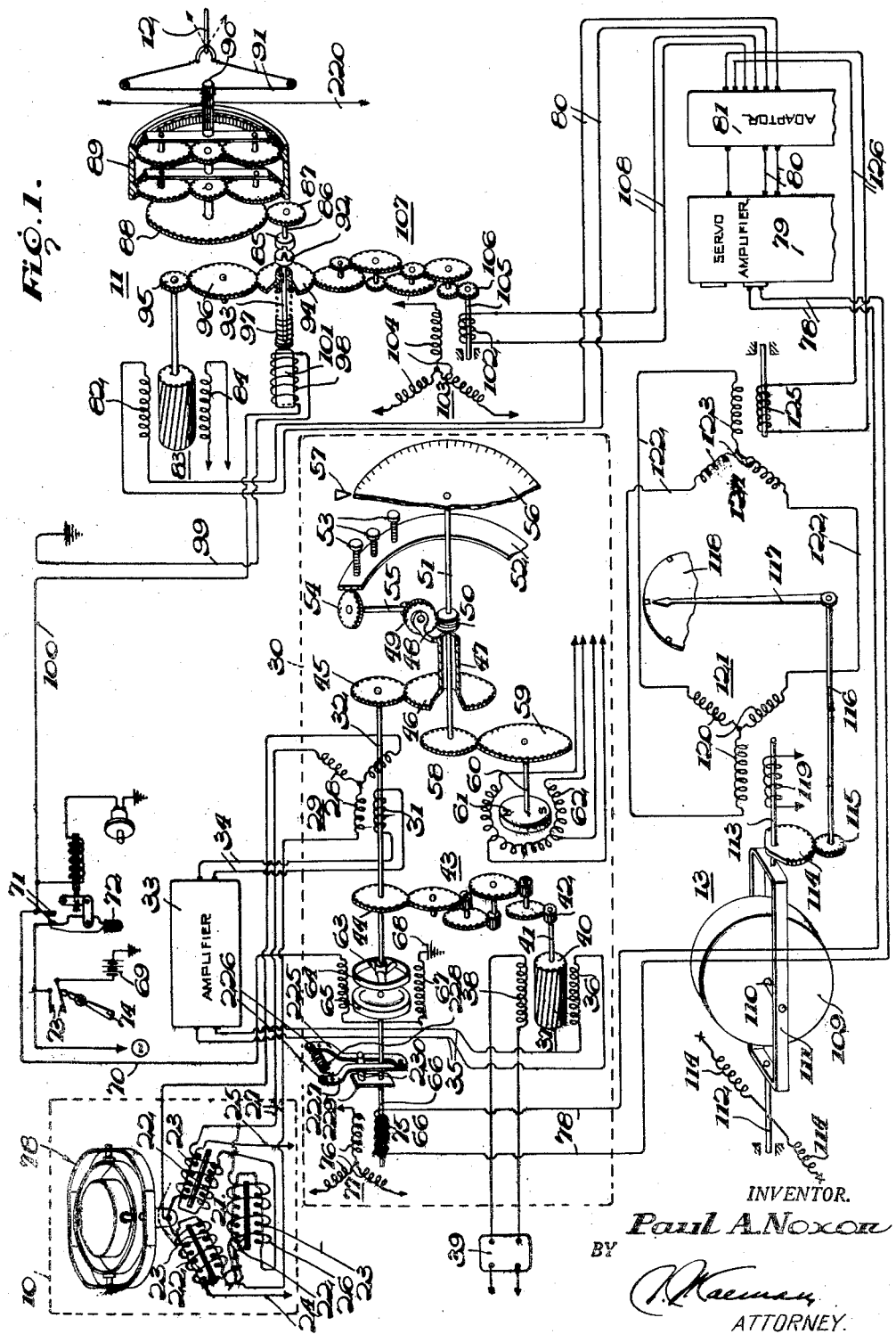

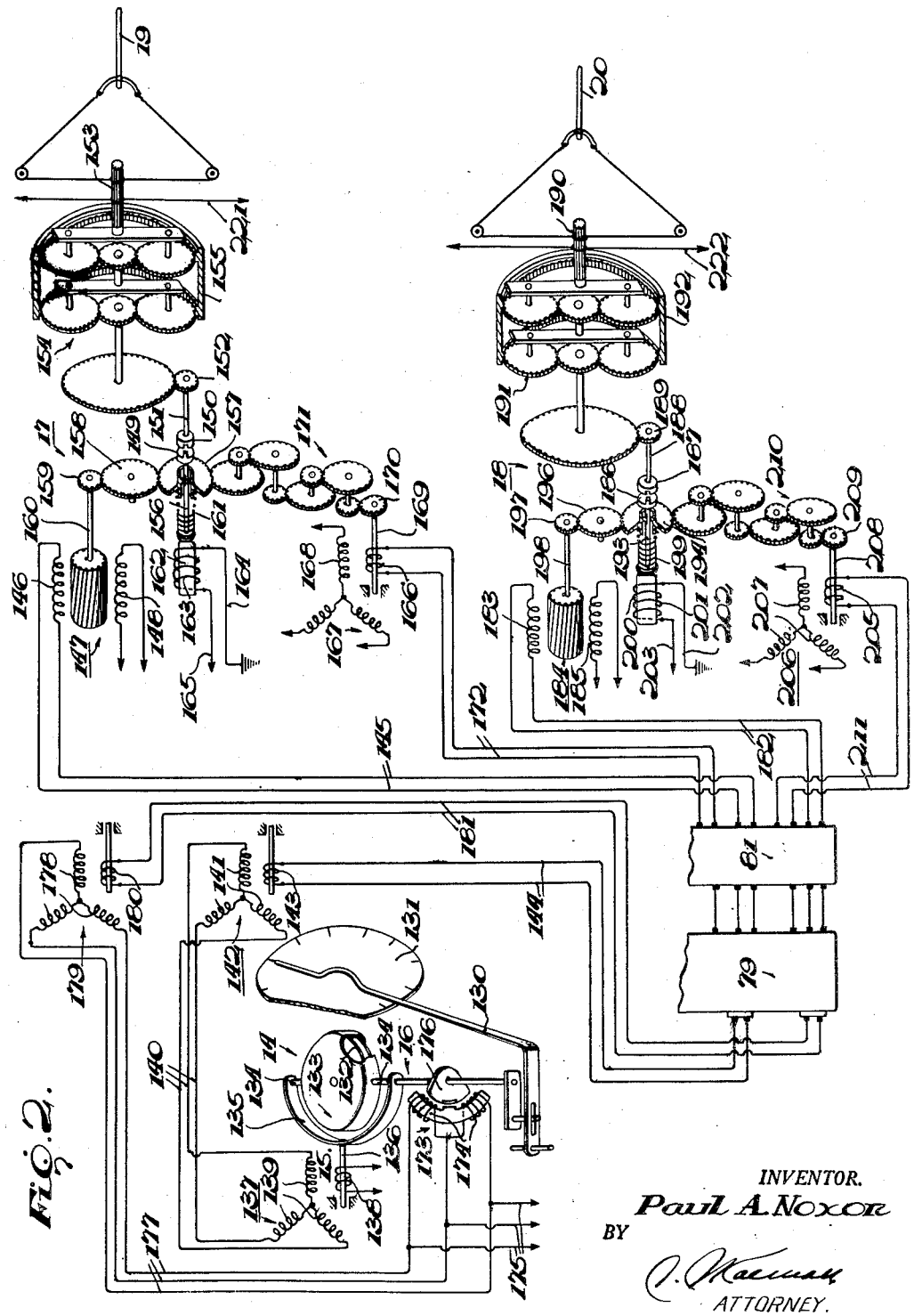

INVENTOR.
Paul A. Noxon
BY
ATTORNEY

Patented Apr. 6, 1954

2,674,423

UNITED STATES PATENT OFFICE 2,674,423

AUTOMATIC PILOT

Paul A. Noxon, Tenafly, N. J., assignor to Bendix Aviation Corporation, Teterboro, N. J., a corporation of Delaware Application December 31, 1943, Serial No. 516,490

33 Claims. (Cl. 244—77).

This invention relates generally to automatic pilot or control systems for dirigible craft and more particularly to an automatic control system which is maintained at all times in exact synchronism with the attitude of the craft at any given instant.

Heretofore, it has been the practice with systems of this general nature to place the burden on the human pilot to adjust manually the various portions of the automatic control apparatus into synchronism with the particular attitude of the craft, whether level or otherwise, before the automatic pilot could be engaged. The disadvantages, in addition to the obvious and undesirable burden being placed on the human pilot, arising out of the use of such systems reside in that an extremely precise adjustment of the automatic control system was essential with reference to the position of the various craft control surfaces so as to avoid sudden jolts and other undesirable effects when the automatic pilot assumed initial control of the craft.

An object of the present invention, therefore, is to provide a novel automatic control system for dirigible craft with the use of which the burden previously imposed upon the human pilot requiring manual adjustment of the system relative to the craft control surfaces prior to engagement of the automatic system has been eliminated.

Another object of the present invention is to provide a novel automatic control and/or steering system for dirigible craft, which is automatically maintained at all times in exact synchronization with the instantaneous attitude of the craft no matter what the craft attitude may be.

A further object of the invention is to provide a novel automatic pilot for dirigible craft which is ready at all times to take over control and direct the craft on the course and in the attitude in which the craft had been placed immediately prior to the instant that the automatic pilot has been engaged.

Another object is to provide a novel automatic pilot for aircraft which is maintained at all times in exact synchronism with the craft control surfaces so that the automatic pilot may be engaged and disengaged by the human pilot by simply closing and opening a single switch.

A further object of the invention is to provide a novel all electric three axes of control automatic pilot having rudder, aileron and elevator servomotors together with a direction signal generating means and a rate signal generating means for operating the rudder servo, and bank and pitch signal generating means for operating the aileron and elevator servos, clutches being provided between the direction signal generating means and the rudder servo as well as between the rudder, aileron and elevator servos and their respective control surfaces so that upon the operation of a single switch the servos will be disconnected from their respective control surfaces and the direction signal means will be simultaneously disconnected from the rudder servo or vice versa.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views, Figure 1 is a diagrammatic illustration of the rudder control system of the automatic pilot embodying the novel synchronizing feature of the present invention;

Figure 2 is a view similar to that of Figure 1 illustrating the aileron and elevator control systems;

Figure 3 is a longitudinal cross section view of one practical form of a master indicator adapted for use with the automatic pilot disclosed embodying one novel synchronization feature;

Figure 4 is a fragmentary detail view of a portion of the structure of Figure 3; and, Figure 5 is a top plan view with the outer casing removed, of the structure of Figure 3.

Figure 5:
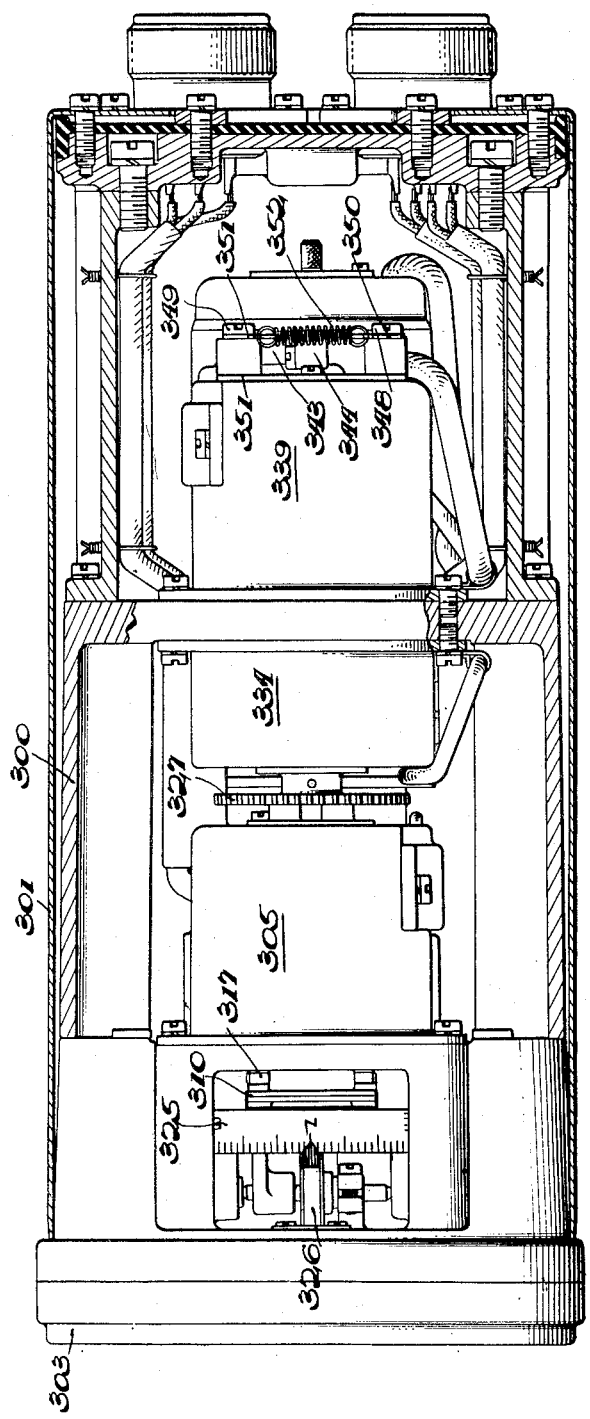

As a general consideration, the novel and desirable features of the present invention are attained, as will be presently described in greater detail, by the novel arrangement of three solenoid operated clutches, adapted for energization from a single switch: one of the solenoid clutches being arranged between the rudder driving motor and the rudder surface, a second one being arranged between the aileron driving motor and the aileron surfaces and the third one being arranged between the elevator driving motor and the elevator surfaces. Each of the motors is provided with a follow-back signal generating means which constantly seek a null position, the motors being energized by their respective reference signal generating expedients and when the switch is operated to a closed position the solenoid operated clutches act to connect the driving motors with their respective control surfaces to control craft flight.

When, on the other hand, the switch is operated to an open position the solenoids are de-energized to disconnect the driving motors from their respective control surfaces so that the surfaces may be operated manually independently of the motors but the motors, nevertheless, continue to operate, in response to any signals fed thereinto as a result of the change of craft course or attitude, to a position of synchronism with the varying signals, as dictated by the position of the craft, so that, in order to subsequently engage the pilot, the switch need merely be operated to its closed position since all the driving motors of the system have been automatically driven to nulls determined by the signals corresponding to craft attitude, and the control surfaces prepositioned manually to maintain that attitude.

When the switch is opened to de-energize the solenoid operated clutches, an electromagnetic clutch at the direction signal generating means is also de-energized whereby the direction signal generating means is disconnected from the rudder motor so that the rate signal and the follow-back signals are the only signals for operating the latter motor when the switch is open.

Referring now to the drawings, and more particularly to Figures 1 and 2 thereof, the present invention is there shown as embodied in a novel automatic pilot, adapted for controlling a craft about three axes thereof. The novel pilot comprises a magnetic field pick-up device, generally designated with the reference numeral 10, in the form of a gyro-stabilized earth inductor compass, for generating an electrical signal during craft deviation from a prescribed course, proportional to the amount of deviation, for energizing a rudder servomotor system 11 to actuate a rudder surface 12; a rate of turn responsive gyro 13 adapted for generating a second electrical signal proportional to the rate of turn which is superimposed upon the directional signal to modify energization of rudder servomotor system 11; and an artificial horizon gyro 14 having bank and pitch take-offs 15 and 16 for generating signals in proportion to the bank and pitch of the craft for energizing aileron and elevator servomotor systems 17 and 18 to actuate aileron and elevator surfaces 19 and 20.

The automatic pilot shown herein is more fully described in copending application Serial No. 516,488, filed December 31, 1943, now U. S. Patent No. 2,625,348 issued January 13, 1953, and assigned to the assignee of the present invention. For that reason only so much of the automatic steering system will be described herein as is necessary to an understanding of the present invention.

The magnetic field pick-up device for generating an electrical signal proportional to the amount of craft deviation from a prescribed course comprises a triangular element 21 having three laminated legs, each of which is provided with a pair of exciting windings 22, 23 connected in series opposed relation with each other and with a suitable source of craft's alternating current (not shown) by way of leads 24 and 25. Wound in inductive relation to the first coils, which may be considered as primary windings of the device, is a delta connected coil 26, which may be termed as the secondary winding of the device. Coil 26 is provided with three taps for connecting it by way of leads 27 with a three phase wound stator 28 of an inductive coupling device 29 suitably arranged within a master indicator 30. Coupling device 29 is provided with an angularly movable rotor winding 31 inductively associated with the stator windings and carried by a shaft 32 for angular motion relative thereto.

Rotor winding 31 is connected to the input of a suitable vacuum tube amplifier 33 by way of leads 34, the outlet of the amplifier feeding by way of leads 35 to one phase winding 36 of a two phase induction motor 37, the second phase winding 38 of which connects with the craft's source of A. C. current through a suitable frequency doubler 39, the latter also being provided with a conventional phase shifting network to maintain the voltages within the two phase windings substantially 90° apart as is known in the use of such motors.

Induction motor 37 has a suitable rotor 40 carried by a shaft 41 provided at its outer end with a pinion 42 adapted for driving through a speed reduction gear system 43 a gear 44 fastened to rotor shaft 32. A gear 45 is supported by the free end of shaft 32 and meshes with a gear 46 having connected thereto or formed integrally therewith a hollow shaft 47 supporting by way of an arm 48 the shaft of a worm 49 which meshes with a worm 50 formed on or carried by a spindle shaft 51 which passes through hollow shaft 47. An annular compensator 52 having a series of adjusting screws 53 in engagement therewith is contacted by a follower 54 supported by an arm 55 fastened to the shaft of worm 49. Thus, in addition to any motion imparted by rotor shaft 32 to spindle shaft 51, the latter is also moved a small angular amount in one direction or another depending upon the contour of element 52 engaged by follower 54.

A suitable indicating dial 56 is mounted on one end of spindle shaft 51 for cooperation with a fixed index 57 while the opposite end of the spindle is provided with a gear 58 for meshing with a gear 59 carried by a shaft 60 supporting a magnetic rotor 61 thereon which is magnetically coupled with a stator winding 62 of an electromagnetic transmitter, the latter being adapted for connection to a similar device acting as a receiver located at a remote station to reproduce the indication of heading.

The free end of rotor shaft 32 carries through a resilient supporting member 63 one face 64 of a novel magnetic clutch, described and claimed more fully in copending application Serial No. 513,421, filed December 8, 1943, now U. S. Patent No. 2,407,757, issued September 17, 1946, and assigned to the assignee of the present invention. A cooperating clutch face 65 is supported by a suitably journalled shaft 66, both faces 64, 65 being formed of magnetic material. A suitable coil 67 surrounds the clutch faces having one end thereof grounded as at 68 and the other end thereof connected with a battery 69 by way of a lead 70, contacts 71 of a servo clutch switch 72, and contacts 73 of a power switch 74.

Upon closing of switches 74 and 72, coil 67 is energized and clutch faces 64, 65 are brought into driving engagement whereby any motion of shaft 32 is immediately transmitted to shaft 66 which also supports thereon, for angular motion therewith, a rotor winding 75 inductively associated with a three phase wound stator 76 of an inductive transmitting device 77.

Triangular element 21 of the magnetic field pick-up device together with its primary and secondary windings is stabilized by means of a three-degree-of-freedom gyroscope, generally designated with the reference character 78, so that a compass is provided in which, for all practical purposes, turning and acceleration errors are eliminated.

As described more fully in the aforementioned copending application Serial No. 516,488, now U. S. Patent No. 2,625,348 issued January 13, 1953, upon a craft departure from a prescribed course the voltages induced within coil 26 are varied to vary the voltages at stator 28 whereby a signal is induced within rotor winding 31, proportional to the amount of craft departure from its course, which is amplified within amplifier 33 to energize phase winding 36 of motor 37, the second phase being continuously energized from the craft's source of A. C. current. Rotor 40 of motor 37 drives shaft 32 and rotor winding 31 to a null position, i. e., one wherein the electrical axis of the rotor winding is perpendicular to the resultant magnetic field of the stator windings, whereupon the induced signal drops to zero and motor 37 is de-energized. At the same time, assuming clutch faces 64, 65 to be in driving engagement, rotor winding 75 of inductive devices 77 is moved angularly relative to stator windings 76 and a signal is induced therein proportional to the amount of craft departure from its prescribed course.

The electrical signal thus generated within rotor winding 75 is fed by suitable leads 78 to the input of a suitable servo vacuum tube amplifier 79 and out therefrom by way of outlet leads 80 through a servo adapter 81 to energize one phase winding 82 of an induction motor 83, the second phase winding 84 of which is continuously energized from the craft's source of A. C. current.

A driving connection between motor 83 and rudder 12 is established by way of a servo clutch comprising a clutch face 85 mounted upon a shaft 86 carrying a pinion 87 thereon for engagement with a speed reduction gear system 88 supported within a relatively stationary servo casing 89 for driving a rudder shaft 90 connected by means of cables 91 with rudder 12, and a second clutch face 92 fastened to a shaft 93 keyed to a gear 94 but adapted for longitudinal motion relative thereto, gear 94 connecting with a pinion 95 of motor 83 through an idler gear 96. The free end of shaft 93 has an enlarged portion defining an abutment for one end of a spring member 97 the other end of which rests against gear 94.

The actuating means for axially moving shaft 93 to the right to force clutch face 92 to drivably engage clutch face 85 comprises a solenoid coil 98 grounded at one end by way of a lead 99 and connected to one of contacts 71 of servo clutch switch 72 by way of a lead 100. With the latter switch closed, a core 101 of the solenoid is urged to the right against the action of spring 97 to axially move shaft 93 therewith to provide engagement of the clutch faces so that motor 83 drives rudder 12.

In driving gear 94, motor 83 also angularly displaces a rotor winding 102 of an inductive follow-back device 103 having a three phase wound stator 104, the rotor being supported by a shaft 105 having a pinion 106 which is drivably connected to gear 94 through a suitable speed reduction gear train 107. Displacement of rotor winding 102 relative to stator windings 104 during operation of motor 83 generates an electrical follow-back signal which is fed by means of leads 108 to amplifier 79 through servo adapter 81 to be impressed upon the direction signal within the amplifier to thereby modify the operation of the motor. The follow-back signal opposes the direction signal and at such time that the follow-back signal is equal and opposite to the direction signal motor 83 is de-energized.

When the craft departs from its prescribed course it develops a certain amount of angular velocity which is also taken into account in the control of rudder 12. To this end, the rate gyro 13 is provided which comprises a rotor 109 having normally horizontal spin axis supported by way of inner trunnions 110 within a gimbal ring 111, the latter being mounted upon a rigid support by way of trunnions 112 and 113 for oscillation about a second horizontal axis perpendicular to the spin axis. Resilient members 114 secured to trunnion 112 yieldably restrain gyro precession during turn to a rate of turn function.

Trunnion 113 of gyro 13 carries a gear sector 114 for meshing with a pinion 115 mounted on a spindle shaft 116 carrying an indicator 117 adapted for cooperation with a suitable scale 118, as well as a rotor winding 119 inductively associated with a three phase wound stator 120 of an inductive device 121, the rotor being connected for energization by the craft's source of A. C. current.

The windings of stator 120 connect by way of leads 122 with a three phase wound stator 123 of an inductive receiver device 124 likewise provided with a rotor winding 125 which is connected to adapter 81 by way of leads 126 to be there superimposed upon the follow-back signal to further modify the operation of motor 83 when the craft departs from a predetermined course. Due to such departure, the induced voltages within stator windings 120 vary causing a corresponding change in the voltages of stator windings 123 whereupon a signal proportional to the rate of turn is generated within rotor winding 125 to be algebraically added to the direction and follow-back signals energizing phase winding 82 of motor 83.

More specifically, during an initial departure of the craft from a prescribed course, the rate signal adds with the direction signal and opposes the follow-back signal to hasten outward movement of rudder 12. The rudder is operated until the follow-back signal equals and opposes the rate and direction signals whereupon the motor is deenergized and the rudder has reached a definite outward position. The applied rudder causes the craft to come to a stop and to swing back to its prescribed course at which time the rate signal drops to zero and then builds up again in an opposite direction to oppose the direction signal, which now diminishes, but adds to the follow-back signal until the rudder is returned to a neutral position at which time the rotor winding 102 is driven to a null and the follow-back signal drops to zero.

Except for the absence of the rate signal, substantially the same action takes place at the other two control axes of the craft. To this end, the three-degree-of-freedom gyroscope 14 comprises an artificial horizon which may have a horizon bar 130 mounted for up and down movement relative to a mask 131 for designating craft pitch, the mask, in turn, being adapted for angular movement relative to the bar for designating craft bank. The artificial horizon comprises an electrically driven rotor 132 having normally vertical spin axis mounted within a rotor bearing frame 133 provided with inner trunnions 134 mounting the rotor and frame within a gimbal ring 135 for oscillation about a first horizontal axis, the gimbal having an outer trunnion 136 mounting it for oscillation about a second horizontal axis perpendicular to the first.

Bank take-off 15 comprises an inductive transmitter device 137 having a rotor winding 138 carried by outer trunnion 136 and energized from the craft's source of A. C. current, rotor 138 being inductively associated with a three phase wound stator 139 which connects by way of leads 140 with a three phase wound stator 141 of an inductive receiver device 142 having a rotor winding 143 inductively coupled therewith so that any change of voltages caused within stator 139 due to angular movement of rotor winding 138 creates a like change in the voltages of stator 141 whereby a signal is induced within receiver rotor winding 143 proportional to the amount of craft bank.

The electrical signal induced within rotor winding 143 is fed into and amplified within amplifier 79 by way of leads 144 and fed out therefrom through servo adapter 81 by way of outlet leads 145 to one phase winding 146 of a two phase induction motor 147, the second phase winding 148 of which is continuously energized from the craft's source of A. C. current. Motor 147 constitutes a part of the aileron servo system 17 and a driving connection is established between it and aileron surfaces 19 through a solenoid operated clutch which comprises two clutch faces 149 and 150, the latter being carried by a shaft 151 provided with a pinion 152 thereon for driving aileron driving shaft 153 through a speed reduction gear system 154 supported within a relatively stationary casing 155 and clutch face 149 being carried by a shaft 156 which has a gear 157 keyed thereto but is adapted for axial movement relative thereto. Gear 157 is driven by motor 147 through an idler 158 which meshes with a pinion 159 carried by a motor shaft 160.

Clutch faces 149 and 150 are normally held disengaged by virtue of a resilient spring 161 which abuts gear 157 at one of its ends and an enlarged portion of shaft 156 at its other end to urge the latter shaft to the left. The actuating means for axially moving shaft 156 to the right to force clutch face 149 to drivably engage clutch face 150 comprises a solenoid coil 163 which is grounded at one end by a lead 164 and at its other end connects by way of a lead 165 with servo clutch switch 72. One manner of accomplishing such a connection is to tap lead 165 to lead 100 of Figure 1. With the switch in its "on" position, i. e., with contacts 71 engaged, coil 163 is energized to urge core 162 to the right whereupon shaft 156 is moved to the right to bring clutch face 149 into engagement with clutch face 150 whereby a driving connection is established between motors 147 and the ailerons.

In driving gear 157, motor 147 also angularly displaces a rotor winding 166 of an inductive follow-back device 167 having a three phase wound stator 168, the rotor winding being supported by a shaft 169 having a pinion 170 thereon which drivably connects with gear 157 through a suitable speed reduction gear train 171. Displacement of rotor winding 166 relative to stator windings 168 during operation of motor 147 generates an electrical follow-back signal which is fed by way of leads 172 to amplifier 79 through servo adapter 81 to be impressed upon the bank signal within the amplifier to thereby modify operation of motor 147. The follow-back signal opposes the bank signal and at such time that the follow-back signal is equal and opposite to the bank signal motor 147 becomes de-energized.

Pitch take-off 16 comprises an inductive transmitter device 173 having stator windings 174 provided with three taps, the windings being energized from the craft's source of A. C. current by virtue of leads 175. A rotor 176 in the form of a magnetic vane is inductively associated with the stator and is secured to inner trunnion 134 for angular movement relative to the stator windings. Stator windings 174 connect by way of leads 177 with a three phase wound stator 178 of an inductive receiver device 179 having a rotor winding 180 inductively associated therewith so that any change in voltages caused within stator windings 174 due to angular movement of rotor 176 creates a like change in the voltages of stator 178 whereby a signal is induced within rotor winding 180 proportional to the amount of craft pitch.

The signal induced within rotor winding 180 is fed by conductors 181 to amplifier 79 and out therefrom through servo adapter 81 by way of outlet leads 182 to one phase winding 183 of a two phase induction motor 184, the second phase winding 185 of which is continuously energized from the craft's source of A. C. current.

Motor 184 constitutes a part of the elevator servo system 18 and a driving connection is established between it and elevator control surfaces 20 through a solenoid operated clutch which comprises two clutch faces 186 and 187, the latter being carried by a shaft 188 provided with a pinion 189 thereon for operating elevator driving shaft 190 through a speed reduction gear system 191 supported within a relatively stationary casing 192 and clutch face 186 being carried by a shaft 193 which has a gear 194 keyed thereto but is adapted for axial movement relative thereto. Gear 194 is driven by motor 184 through an idler 196 which meshes with a pinion 197 carried by a motor shaft 198.

Clutch faces 185 and 186 are normally held disengaged by virtue of a resilient spring 199 which abuts gear 194 at one of its ends and an enlarged portion of shaft 193 at its other end to urge the latter shaft to the left. The enlarged end of shaft 193 is engaged by a core 200 of a solenoid whose coil 201 is grounded at one end by a lead 202 and at its other end is connected by way of a lead 203 with servo clutch switch 72. This connection may be accomplished by tapping lead 203 to lead 100 of Figure 1. With the switch in its "on" position, i. e., with contacts 71 engaged, coil 201 is energized to urge core 200 to the right whereupon shaft 193 is moved to the right to bring clutch face 186 into engagement with clutch face 187 whereby a driving connection is established between motor 184 and the elevator surfaces.

In driving gear 194, motor 184 also angularly displaces a rotor winding 205 of an inductive follow-back device 206 having a three phase wound stator 207, the rotor winding being supported by a shaft 208 having a pinion 209 which is drivably connected to gear 194 through a suitable speed reduction gear train 210. Displacement of rotor winding 205 during operation of motor 184 generates an electrical follow-back signal which is fed by way of leads 211 to amplifier 79 through servo adapter 81 to be impressed upon the pitch signal within the amplifier to thereby modify operation of motor 184. The follow-back signal opposes the pitch signal and at such time that the follow-back signal is equal and opposite to the pitch signal motor 184 becomes de-energized.

With servo clutch switch 72 in an open or "off" position, even though power switch 74 is closed, coil 67 of the magnetic clutch within master indicator 30 of Figure 1 is de-energized so that clutch face 64 is disengaged from clutch face 65 and simultaneously solenoid coils 93, 163 and 201 of the rudder, aileron and elevator servo systems are de-energized whereby motors 83, 147 and 184 are disconnected from their respective control surfaces so that subsequent control of rudder 12, ailerons 19 and elevators 20 may be performed manually in the conventional manner by virtue of cables 220, 221 and 222 connected to rudder, aileron and elevator driving shafts 90, 153 and 190.

It will be noted that if switch 72 is opened at a time when rotor winding 75 of inductive transmitting device 77 of Figure 1 is in a position away from its null, it would normally remain in such displaced position generating a signal because of itself it is incapable of returning to its null position. Thus, if switch 72 were closed to couple shafts 32 and 66, a condition of non-synchronism would exist leading to undesirable results.

Novel means are now provided so that a condition of synchronism will exist at all times in the system, such means comprising, as shown diagrammatically in Figure 1, two lever arms 225 and 227 which are pivoted on fixed pins 226 and interconnected through a resilient member 228 anchored to both arms slightly below pivot pins 226. A bracket 229 is fastened to shaft 66 and is provided with a pin 230 positioned in between arms 225 and 227 so that upon clockwise rotation of shaft 66, for example, pin 230 will move arm 225 outwardly when a turning torque is exerted on shaft 66, spring 228 returning the arm and pin as well as shaft 66 to neutral when the torque is no longer applied, that is, when the clutch is disengaged, while upon a counterclockwise rotation of shaft 66, pin 230 urges arm 227 outwardly, the arm returning pin 230 and shaft 66 to neutral under the action of spring 228 when the turning torque is released.

With the above novel provision rotor winding 75 of inductive transmitter 77 will always be urged to and maintained at an electrical zero prior to the engagement of the automatic steering system. This means that no matter how much the craft course has been changed once it is placed on a desired course and the automatic pilot is engaged, rotor winding 75 will only have a signal generated therein of an amount proportional to the angle of deviation by the craft from the desired course.

Referring now to Figures 3 to 5, inclusive, of the drawings there is shown one practical embodiment of the master indicator 30 of Figure 1 together with its various elements as well as the novel centering mechanism above described. As shown more clearly in Figure 3, the master indicator comprises a suitable casing 300 housed within a removable shell 301, the casing having secured to the open end thereof by means such as screws 302 a cover or bezel member 303 supporting therein a cover glass 304 for sealably closing the open end of the casing.

Suitably arranged within casing 300 is a housing 305 of an inductive coupling device, corresponding to device 29 of Figure 1, comprising stator windings 306 supported therein and a wound rotor 307 which is carried by a shaft 308 journalled, as shown, within suitable bearings. A gear 309 is carried at one end of shaft 308 for meshing with a gear 310 provided with a hollow sleeve member 311 supporting a worm 312 thereon for meshing with a worm 313 carried by a centrally disposed spindle shaft 314. The latter shaft is mounted loosely within sleeve 311 and at one of its ends carries a dial 315 having a scale thereon for cooperation with a fixed index 316 secured to a part of casing 300 and at its other end supports a gear 317 which meshes with a gear 318 mounted on a shaft 319 supporting a magnetic rotor 320 which is inductively associated with a stator winding 321 of an electromagnetic transmitter.

Worm 312 supports a follower element 322 for engagement with an annular compensator element 323 provided with a series of adjustment screws 324 while a scale 325 is supported for movement by sleeve 311 of gear 310 for cooperation with a fixed index 326. The scale 325, shown more clearly in Figure 5, provides an uncompensated reading of heading while main scale or dial 315 provides a compensated reading of heading.

A gear 327 is provided adjacent the opposite end of rotor shaft 308 which is driven through a speed reduction gear train 328 by an induction motor 329 which comprises two phase stator windings 330 supported within a housing 331 and a rotor 332 for driving gear train 328. The same end of shaft 308 has rigidly secured thereto one clutch face 333, formed of magnetic material, of a magnetic clutch 334, the other face 335 of which, likewise formed of magnetic material, is secured to a shaft 336 by means of a resilient element 337 which permits axial movement of clutch face 335 relative to its supporting shaft. Surrounding clutch faces 333 and 335 is a coil 338 which upon energization urges clutch face 335 into driving engagement with clutch face 333 against the action of resilient element 337 to drivably link rotor shaft 308 with shaft 336. Upon de-energization of coil 338, element 337 returns clutch face 335 to a normally disengaged position.

A housing 339, suitably arranged within casing 300, supports therein a three phase wound stator 340 of an inductive transmitter device 341 which is provided with a wound rotor 342 carried by shaft 336. The free end of the latter shaft has secured thereto by means such as a screw 343 a bracket member 344 carrying an outwardly extending pin 345 thereon, better shown in Figures 3 and 4. Secured to a stationary plate 346, fastened to housing 339, is a pin 347 which also projects outwardly from the plate and is arranged below pin 345. Pivotally mounted on the upper part of plate 346 by way of studs 348 and 349 are two arms 350 and 351 which are interconnected through a spring element 352 anchored to both arms slightly below the pivoted points of the arms established by studs 348 and 349, the spring element yieldably urging the free ends of both arms to normally engage pin 347 and center pin 345. Also carried by plate 346 are two outwardly extending abutments 353 and 354 which define stops for limiting outward motion of either of arms 350 and 351.

Thus with the magnetic clutch 334 energized any motion of rotor 307 of the coupling device by induction motor 329 is transmitted to rotor 342 and its mounting shaft 336. Movement of the latter shaft causes pin 345 to move one of the arms 350 or 351 outwardly against the action of spring 352. When clutch 334 is de-energized, spring 352 urges the displaced arm to normal thereby moving pin 345 and shaft 336 therewith whereby rotor 342 is brought to its null or zero electrical position. Thus the rotor of the inductive transmitting device is always maintained at a null position prior to the engagement of the automatic pilot.

With the foregoing novel centering feature and moreover, with the novel arrangement of the inductive follow-back signal generating devices 103, 167 and 206 to be continuously connected directly to their respective driving motors 83, 147 and 184, a system is provided in which synchronism is always maintained between the various signal generating means and the related servo control systems.

Considering, first, the bank and pitch axes, it may be assumed that servo clutch switch 72 is open (power switch 74 being normally closed) so that solenoids 162—163 and 200—201 are de-energized and clutches 149—150 and 186—187 are disengaged, leaving aileron and elevator surfaces 19 and 20 subject to manual control by virtue of cables 221 and 222. Thus, the two control surfaces will be moved independently of the driving motors and their related follow-back devices. Assuming, further, that one or the other or both of the control surfaces 19 and 20 is actuated manually to change the attitude of the craft, such change is immediately detected by one or the other or both of the bank and pitch take-offs 15 and 16 and each generates a signal proportional to the bank and/or pitch imposed on the craft for energizing and driving its related induction motors 147 and 184. Operation of motors 147 and 184, though they are disconnected from their related control surfaces, displaces rotor windings 166 and 205 of inductive follow-back devices 167 and 206 whereby signals are generated in each of the rotor windings which are superimposed upon the bank and pitch signals energizing motors 147 and 184 until the follow-back signals are equal and opposite to the bank and pitch signals whereupon motors 147 and 184 are de-energized. Both rotor windings 166 and 205 being off null at this point, have signals therein which act to reverse operation of the driving motors until the latter return both rotor windings to their respective null positions.

From the foregoing it will be understood that the aileron and elevator driving motors 147 and 184 at all times follow movements of the craft as determined by the bank and pitch take-offs 15 and 16 at the artificial horizon 14. Upon engagement of clutches 149—150 and 186—187, motors 147 and 184 will be drivably connected to their respective control surfaces and, since prior to clutch engagement the motors have been following the movements of the craft as determined by the take-offs, they will be correctly trimmed in accordance with instantaneous craft attitude whatever that may be.

Coming now to the craft's directional axis, rotor winding 75 of inductive transmitter device 77 is returned to its null by virtue of the return mechanism (225—230 of Figure 1 or 344—352 of Figure 3) immediately upon the opening of servo clutch switch 72 which not only causes simultaneous disengagement of servo clutches 149—150 and 186—187 but also of servo clutch 85—92. Thus rudder 12 may be operated manually by virtue of cable 220, connected to rudder shaft 153, independently of rudder driving motor 83 and its follow-back device 103, in the same manner that aileron and elevator control surfaces 19 and 20 may be so operated. Even though the direction signal means is disconnected from rudder driving motor 83, the latter is continuously driven to a position of synchronism with the instantaneous craft course because for a departure from one course to another, the craft develops an angular velocity which is translated by the rate gyro 13 into an electrical signal proportional to the rate of craft turn.

The rate signal so generated energizes motor 83 which, in operating, drives rotor winding 102 of inductive follow-back device 103 from its null whereupon a signal is generated in the windings which is superimposed upon the rate signal to modify operation of motor 83. As soon as rotor winding 102 has been driven far enough wherein its signal is equal and opposite to rate signal the motor is de-energized. The follow-back signal, because at this point the craft has reached its new course and the rate signal drops to zero, reverses operation of motor 83 until the latter drives rotor winding 102 back to its null whereupon the follow-back signal drops to zero and motor 83 becomes de-energized. With servo-motor clutch 85, 92 disconnected, as well as the direction signal generating means being disconnected from motor 83, the latter is continuously driven to a null dependent on the craft change of course to be at all times trimmed with the instantaneous position of rudder 12.

The novel automatic pilot is thus ready to take over control at any moment and fly the craft on the course and in the trim in which it was placed immediately before energization of servo clutches 85, 92; 149—150; 186—187; and of magnetic clutch 64—65.

With power switch 74 in its normally "on" position, servo clutch switch 72 is merely operated to its "on" position whereupon clutch 64—65 of the master indicator is energized as well as servo clutches 85—92; 149—150; and 186—187. From that instant any departure of the craft from course will bring about a corresponding movement of rotor 75 of the inductive transmitter whereupon a signal is developed which, together with the signal developed by rate gyro 13, energizes rudder motor 83 to cause the latter to follow the resultant of the two signals to provide corresponding movements of the rudder. Aileron and elevator surfaces 19 and 20 are operated in substantially the same manner from the bank and pitch take-offs 15 and 16 when the craft departs from a predetermined attitude.

Although but a single embodiment of the invention has been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the present invention reference will be had primarily to the appended claims.

I claim:

1. In an automatic pilot for dirigible craft having a control surface, a servomotor adapted for connection to and for disconnection from said surface, reference means carried by said craft for producing an electric signal when said craft deviates from a predetermined position, transmitter means normally yieldably constrained in a null position and adapted for operative connection to said reference means for operating said motor as a function of the signal produced by said reference means, and means for disconnecting said motor from said surface and also said transmitter means from said reference means whereupon said transmitter means is returned to its null position notwithstanding the existence of a signal produced by said reference means.

2. In an automatic pilot for dirigible craft having a control surface, a servomotor for operating said surface, reference means carried by said craft and comprising an inductive two-part pick-off for producing an electric signal when said craft departs from a predetermined position, means adapted for energization in response to a signal produced by said reference means for actuating said motor, means yieldably constraining said last-named means in a de-energized position notwithstanding the existence of a signal produced by said reference means, and means whereby said actuating means are energized by the signal produced by said reference means.

3. In an automatic pilot for dirigible craft having a rudder for maintaining said craft on a predetermined course, reference means comprising a magnetic field pick-up device carried by said craft and disposed in the earth's magnetic field for generating an electric signal in response to relative displacement of said pick-up device with respect to said earth's magnetic field upon deviation of said craft from said predetermined course, means comprising an induction motor for operating said surface, transmitter means connected to said motor and adapted for actuation by said reference means for operating said motor as a function of the signal produced by said reference means, resilient means normally yieldably maintaining said transmitter means at a null position, and means for connecting said transmitter means for actuation by said reference means.

4. In an automatic pilot for aircraft having rudder, aileron and elevator surfaces therefor, servomotors adapted for connection to and disconnection from said surfaces, reference means carried by said craft for producing a signal when said craft departs from a predetermined course, means carried by said craft for generating a rate signal in accordance with the angular velocity developed by said craft when it departs from said predetermined course for energizing said rudder servomotor even though said rudder servomotor is disconnected from said rudder surface, means carried by said craft for producing bank and pitch signals when said craft departs from a predetermined attitude for energizing said aileron and elevator servomotors even though said last-named motors are disconnected from their respective surfaces, means for connecting said rudder servomotor to said reference means for energization thereby, means for connecting said servomotors to their respective control surfaces, and means for simultaneously operating said first and last-named connecting means.

5. In an automatic pilot for aircraft having rudder, aileron and elevator surfaces therefor, servomotors adapted for connection to and disconnection from said surfaces, reference means carried by said craft for producing a signal when said craft departs from a predetermined course, means carried by said craft for generating a rate signal in accordance with the angular velocity developed by said craft when it departs from said predetermined course for energizing said rudder servomotor even though said rudder motor is disconnected from said rudder surface, means carried by said craft for producing bank and pitch signals when said craft departs from a predetermined attitude for energizing said aileron and elevator servomotors even though said last-named servomotors are disconnected from their respective surfaces, means comprising a normally de-energized magnetic clutch for connecting said rudder servomotor to said reference means for energization thereby, means comprising normally de-energized servo clutches for connecting said servomotors to their respective control surfaces, and means for simultaneously energizing said magnetic clutch and said servo clutches.

6. In an automatic pilot for aircraft having rudder, aileron and elevator surfaces therefor, induction motors adapted for connection to and disconnection from said surfaces, reference means carried by said craft for producing a signal when said craft departs from a predetermined course, means carried by said craft for generating a rate signal in accordance with the angular velocity developed by said craft when it departs from said predetermined course for energizing said rudder induction motor even though said rudder motor is disconnected from said rudder, means carried by said craft for producing bank and pitch signals when said craft departs from a predetermined attitude for energizing said aileron and elevator induction motors even though said last-named motors are disconnected from their respective surfaces, means comprising a normally de-energized magnetic clutch for connecting said rudder induction motor to said reference means for energization thereby, means comprising normally de-energized servo clutches for connecting said motors to their respective control surfaces, and a common control element for simultaneously energizing said magnetic clutch and said servo clutches.

7. An automatic steering system for dirigible craft provided with a rudder, comprising an induction motor for operating said rudder, reference means for producing a signal when said craft departs from a predetermined course, means for operating said motor responsive to a signal produced by said reference means, said operating means being normally yieldably constrained in a de-energized condition whereby said motor is at rest notwithstanding the existence of a signal produced by said reference means, and means for connecting said operating means for energization by the signal from said reference means.

8. An automatic steering system for dirigible craft provided with a rudder, comprising a servo motor for operating said rudder, reference means for producing an electric signal when said craft departs from a predetermined course, means for operating said motor responsive to a signal produced by said reference means, said operating means being normally yieldably constrained to a null position but being adapted for connection to said reference means for operating said motor and for disconnection from said reference means whereby said motor is de-energized notwithstanding the existence of a signal produced by said reference means whereupon said operating means is returned to said null position, and means comprising a clutch for connecting said operating means to said reference means.

9. An automatic steering system for aircraft having a rudder, comprising an electric motor for operating said rudder, reference means carried by said craft for producing an electric signal when said craft departs from a predetermined course, means comprising a second electric motor energized by and in accordance with said signal, an actuating device for said rudder motor adapted for operation by said second motor, and means for selectively connecting and disconnecting said actuating device to and from said second motor.

10. An automatic steering system for aircraft having a rudder, comprising an electric motor for operating said rudder, reference means carried by said craft for producing an electric signal when said craft departs from a predetermined course, a second electric motor energized by said signal, means for energizing said rudder motor, means normally yieldably maintaining said energizing means in a de-energized condition, and means for connecting said energizing means for operation by said second motor.

11. An automatic steering system for dirigible craft provided with a control surface, comprising reference means carried by said craft for producing a signal when said craft departs from a predetermined course, driving means energized by said signal, a servomotor for operating said control surface and being normally disconnected therefrom, a normally yieldably constrained actuating device for said servomotor held in a null position but adapted for operation from said null position by said driving means, and means for simultaneously connecting said actuating device to said driving means and said servomotor to said control surface.

12. An automatic steering system for aircraft having a rudder, comprising an electric motor for operating said rudder and normally disconnected therefrom, reference means carried by said craft for producing an electric signal when said craft departs from a predetermined course, a second electric motor energized by said signal, means for energizing said rudder motor, means normally yieldably maintaining said energizing means in a de-energized condition, and means for simultaneously connecting said energizing means for operation by said second motor and said rudder motor to said rudder.

13. An automatic steering system for aircraft having a rudder, comprising a servomotor for operating said rudder and being normally disconnected therefrom, reference means carried by said craft for producing a directional signal when said craft departs from a predetermined course, means for producing a rate signal in accordance with the angular velocity developed by said craft during departure from said course for energizing said servomotor, driving means energized by said directional signal, means for also energizing said servomotor in accordance with the operation of said driving means, and means for simultaneously connecting said last-named energizing means to said driving means and said servomotor to said rudder.

14. An automatic steering system for aircraft having a rudder, comprising an electric motor for operating said rudder and being normally disconnected therefrom, reference means carried by said craft for producing an electrical directional signal when said craft departs from a predetermined course, means for producing an electrical rate signal in accordance with the angular velocity developed by said craft during departure from said course for energizing said rudder motor, a second electric motor energized by said directional signal, means for also energizing said rudder motor in accordance with the operation of said second motor, means normally yieldably maintaining said last-named energizing means in a de-energized condition, and means for simultaneously connecting said last-named energizing means to said second motor and said rudder motor to said rudder.

15. An automatic steering system for dirigible craft having a control surface, comprising a servomotor for operating said surface, reference means including an inductive device having a signal produced therein when said craft departs from a predetermined course, driving means responsive to said signal for operating said device to a null position wherein said signal disappears and said driving means is de-energized, a second inductive device adapted to have a signal generated therein when it is operated away from its null position, means for connecting said second inductive device for operation by said driving means, and actuating means for said connecting means whereby a signal is produced by said second inductive device in response to a departure by said craft from said predetermined course for energizing said servomotor.

16. An automatic steering system for dirigible craft having a control surface, comprising a servomotor for operating said surface, reference means including an inductive device having a signal produced therein when said craft departs from a predetermined course, driving means responsive to said signal for operating said device to a null position wherein said signal disappears and said driving means is de-energized, a second inductive device adapted to have a signal generated therein when it is operated away from its null position, means normally yieldably restraining said second inductive device to a null position, means for connecting said second inductive device for operation by said driving means, and actuating means for said connecting means whereby a signal is produced by said second inductive device in response to a departure by said craft from said predetermined course for energizing said servomotor.

17. An automatic steering system for dirigible craft having a control surface, comprising a servomotor for operating said surface, reference means including an inductive device having a signal produced therein when said craft departs from a predetermined course, driving means responsive to said signal for operating said device to a null position wherein said signal disappears and said driving means is de-energized, a second inductive device adapted to have a signal generated therein when it is operated away from its null position, means normally yieldably restraining said second inductive device to a null position, and means comprising a magnetic clutch for connecting said second inductive device for operation by said driving means whereby a signal is produced by said second inductive device in response to a departure by said craft from said predetermined course for energizing said servomotor.

18. An automatic steering system for aircraft having a rudder, comprising a servomotor for operating said rudder and being normally disconnected therefrom, reference means carried by said craft for producing a signal when said craft departs from a predetermined course, driving means energized by said signal, energizing means for said servomotor, means normally yieldably maintaining said energizing means in a de-energized condition, and means for connecting said energizing means for operation by said driving means and for connecting said servomotor to said rudder, said last-named means being adapted for disconnecting said energizing means from said driving means and for disconnecting said servomotor from said rudder whereupon said yieldable means returns said energizing means to a de-energized position.

19. An automatic steering system for dirigible craft having a control surface, comprising a servomotor for operating said surface, reference means including an inductive device having an angularly movable portion whereby an electric signal is generated in said portion when said craft departs from a predetermined course, means responsive to said signal for driving said portion to a null wherein said signal disappears and said driving means is de-energized, a second inductive device having an angularly movable portion whereby a signal is produced therein when said last-named portion is moved from a null position, and means for connecting said second inductive device to said driving means whereby a signal is produced within said second portion in response to a departure of said craft from said predetermined course for energizing said servomotor.

20. An automatic steering system for dirigible craft having a control surface, comprising a servomotor for operating said surface, reference means including an inductive device having an angularly movable portion whereby an electric signal is generated in said portion when said craft departs from a predetermined course, means responsive to said signal for driving said portion to a null wherein said signal disappears and said driving means is de-energized, a second inductive device having an angularly movable portion whereby a signal is produced therein when said last-named portion is moved from a null position, means normally yieldably maintaining said second portion in a null position, and means for connecting said second inductive device to said driving means whereby said second portion is moved from its null and a signal developed therein in response to a departure by said craft from said predetermined course for energizing said servomotor.

21. An automatic steering system for dirigible craft having a control surface, comprising a servomotor for operating said surface, reference means including an inductive device comprising a stator and an angularly movable rotor inductively associated therewith whereby an electric signal is generated in said rotor when said craft departs from a predetermined course, means responsive to said signal for driving said rotor to a null wherein said signal disappears and said driving means is de-energized, a second inductive device having a stator and an angularly movable rotor inductively associated therewith whereby a signal is produced in said rotor when it is moved from a null position, means normally yieldably maintaining said second rotor in a null position, and means for connecting said second rotor to said driving means whereby a signal is developed in said second rotor in response to a departure by said craft from said predetermined course for energizing said servomotor.

22. An automatic steering system for dirigible craft having a control surface, comprising a servomotor for operating said control surface, reference means including an inductive device having an angularly movable portion whereby an electric signal is generated in said portion when said craft departs from a prescribed course, means responsive to said signal for driving said portion to a null wherein said signal disappears and said driving means is de-energized, a second inductive device having an angularly movable portion, means normally yieldably maintaining said last-named portion in a null position, means for connecting said second inductive device with said driving means, a third inductive device connected for operation by said servo motor, means for connecting said servomotor with said surface, and common means for operating both of said connecting means simultaneously whereby said second portion is moved angularly against said yieldable means for producing an electric signal for energizing said servo motor when said craft has departed from its predetermined course and for connecting said servomotor to said surface for driving said surface whereby another signal is generated by said third inductive device for modifying the operation of said servomotor.

23. In an automatic pilot for aircraft having rudder, aileron and elevator surfaces therefor, servomotors for actuating said surfaces, reference means carried by said craft for producing a directional signal when said craft departs from a predetermined course, means carried by said craft for producing bank and pitch signals when said craft departs from a predetermined attitude for energizing said aileron and elevator servo motors, means for connecting said rudder servomotor to said reference means for energization thereby, means for connecting said servo motors to their respective control surfaces, and common means for simultaneously operating said first and last-named connecting means whereby said rudder motor is operated in accordance with said directional signal and said servomotors are connected with their respective control surfaces, said common means being adapted for simultaneously disconnecting said rudder servo motor from said reference means and said servomotors from their respective control surfaces, said aileron and elevator servo motors being energized by said bank and pitch signal producing means when said craft departs from said predetermined attitude notwithstanding the disconnection of said aileron and elevator servomotors from their respective control surfaces whereby said last-named servomotors follow movement of their related control surfaces.

24. In an automatic pilot for aircraft having rudder, aileron and elevator control surfaces therefor, servomotors for actuating said surfaces, reference means carried by said craft for producing a directional signal when said craft departs from a predetermined course, means carried by said craft for producing bank and pitch signals when said craft departs from a predetermined attitude for energizing said aileron and elevator servomotors, means comprising a magnetic clutch for connecting said rudder servomotor to said reference means for energization thereby, means comprising servo clutches for connecting said servomotors to their respective control surfaces, and a common member for simultaneously operating said magnetic clutch and said servo clutches whereby said rudder motor is connected to said reference means for operation in accordance with said directional signal and said servomotors are connected with their respective control surfaces, said common member being adapted for simultaneously operating said magnetic clutch and said servo clutches to disconnect said rudder motor from said reference means and said servomotors from their respective control surfaces, said aileron and elevator servo motors being constantly energized by said pitch and bank signal producing means when said craft departs from said predetermined attitude notwithstanding the disconnection of said aileron and elevator servomotors from their respective control surfaces whereby said last-named motors follow movement of their related control surfaces.

25. In an automatic pilot for aircraft having rudder, aileron and elevator surfaces therefor, servomotors adapted for connection to and disconnection from said surfaces, reference means carried by said craft for producing a directional signal when said craft departs from a predetermined course, means for producing a rate signal in accordance with the angular velocity developed by said craft during departure from said predetermined course for energizing said rudder servomotor, means carried by said craft for producing bank and pitch signals when said craft departs from a predetermined attitude for energizing said aileron and elevator servomotors, means for connecting said reference means to said rudder servomotor for also energizing said rudder servo in accordance with the directional signal, means for connecting said servomotors to their respective control surfaces, and means for simultaneously operating said first and last-named connecting means whereby said rudder servomotor is also operated in accordance with said directional signal and said servomotors are connected with their respective control surfaces, said last-named means being also adapted for simultaneously operating said first and last-named connecting means to disconnect said reference means from said rudder servomotor and said servomotors from their respective control surfaces, said aileron and elevator servomotors being energized by said bank and pitch signal producing means when said craft departs from said predetermined attitude notwithstanding the disconnection of said aileron and elevator servomotors from their respective control surfaces whereby said last-named servomotors follow motion of their related surfaces, and said rudder servomotor being energized by said rate signal generating means when said craft departs from said predetermined course notwithstanding the disconnection of said rudder servomotor from said rudder control surface whereby said rudder motor follows motion of said rudder.

26. The combination with an automatic steering system for dirigible craft having a movable control surface thereon, comprising reference means including an inductive two-part pick-off for producing an electric signal when said craft departs from a predetermined position and a servomotor for operating said surface in accordance with said signal, of synchronizing means for said system comprising a transmitter device connected to said servomotor and normally maintained in a null position, means for connecting said transmitter for operation by said reference means and for disconnecting it from said reference means, and means for urging said transmitter to its null when it is disconnected from said reference means.

27. In an automatic pilot for dirigible craft having a control surface, a servomotor for operating said surface, reference means carried by said craft and comprising a two-part pick-off for producing an electric signal when said craft deviates from a predetermined position, transmitter means connected to said servomotor and adapted for actuation by said reference means for operating said motor as a function of the signal produced by said reference means, means yieldably urging said transmitter means to a null position, and means for connecting said transmitter means for actuation by said reference means.

28. An automatic pilot for positioning a control surface of a craft comprising a flux valve adapted to provide a signal voltage output varying with changes in relative position of said flux valve and the earth's field, a signal transformer having a stator winding connected to receive the flux valve output and a rotor including a winding associated therewith, means connected to receive the signal voltage induced in said rotor winding and controlled thereby for controlling the position of said rotor relative to said stator whereby to zero the signal voltage induced in said rotor winding, pick-off means actuated by said rotor-positioning means, a servomotor for actuating said control surface, and means responsive to the signal output of said pick-off means for controlling said servo.

29. An automatic steering system for a craft having a rudder, comprising an inductive device having a multi-polar stator winding and a rotor winding, an actuating device, means connecting said actuating device to the rotor winding of said inductive device for actuating said rotor winding, a source of alternating current, an induction device comprising a core of permeable magnetic material adapted to receive a magnetic flux from a unidirectional magnetic field, a multi-polar stator winding on said core, a single phase winding on said core connected for energization by said source of alternating current, means for interconnecting the multi-polar winding of said core to the multi-polar winding of said inductive device, means electrically connecting the rotor winding of said inductive device to said actuating device for energizing the latter, a servomotor drivably connected to actuate the rudder of the craft, and means comprising an amplifier for operating said servomotor in response to energization of said actuating device.

30. In an automatic steering system for a craft having a rudder and a motor for operating said rudder, the combination of an inductive device having a multi-polar stator winding and a rotor winding, an electromagnetic actuating device, means drivably connecting said actuating device to the rotor winding of said inductive device for rotating said rotor winding, a source of alternating current, direction responsive means comprising an induction device disposed in and traversed by the magnetic flux of a unidirectional magnetic field and including a stationary multi-polar winding electrically connected to the multi-polar winding of said inductive device and a stationary single phase winding electrically connected to said alternating current source for energization thereby, means electrically connecting the rotor winding of said inductive device to said electromagnetic actuating device for energizing the latter, and means responsive to the energization of said actuating device for operating said motor.

31. An automatic pilot for positioning a control surface of a craft comprising a flux valve adapted to provide a signal voltage output varying with changes in relative position of said flux valve and the earth's field, a signal transformer having a stator winding connected to receive the flux valve output and a rotor including a winding associated therewith, means for positioning said rotor, means sensitive to the instantaneous polarity of a signal voltage and connected with said rotor winding whereby to be controlled by the voltages induced therein for controlling said rotor-positioning means to position said rotor so as to reduce the voltage output of the rotor winding substantially to zero, pick-off means actuated by said rotor-positioning means, a servomotor for actuating said control surface, and means responsive to the signal output of said pick-off means for controlling said servo.

32. In an automatic pilot for dirigible craft having a control surface normally adapted for manual operation, a servomotor adapted for operative connection to said surface, reference means carried by the craft for producing an electric signal when the craft departs from a predetermined position for energizing said servomotor at the time the servomotor is connected to said surface and for also producing an electric signal when the craft departs from a predetermined position in response to manual operation of the surface when the motor is disconnected from the surface, means for connecting said motor to and disconnecting it from said surface, and means operative when said motor is disconnected from said surface for automatically synchronizing said motor with said reference means so that subsequent to manual control of said surface to change craft position the motor, upon connection to said surface, operates said surface only when a signal is developed by said reference means as a result of deviation of said craft from said last-named position.

33. In an automatic pilot for dirigible craft having a control surface, a servomotor adapted for connection to and disconnection from said surface, reference means carried by said craft for producing an electric signal when said craft deviates from a predetermined position, transmitter means connected to said servomotor and adapted for connection to said reference means for actuation thereby to operate said servomotor as a function of the signal produced by said reference means, means normally yieldably constraining said transmitter means to a null position when said transmitter means is disconnected from said reference means, and common control means for selectively connecting and disconnecting said transmitter means to and from said reference means and for connecting and disconnecting said servomotor to and from said surface.

References Cited in the file of this patent

UNITED STATES PATENTS

| Number | Name | Date |
|---|---|---|
| 1,415,003 | Sperry | May 2, 1922 |
| 1,418,335 | Sperry | June 6, 1922 |
| 1,772,788 | Sperry | Aug. 12, 1930 |
| 1,908,801 | Plutino | Apr. 18, 1933 |
| 1,958,258 | Alexanderson | May 8, 1934 |
| 1,958,259 | Becker | May 8, 1934 |
| 2,139,558 | Moseley et al. | Dec. 6, 1938 |
| 2,190,390 | Thiry | Feb. 13, 1940 |
| 2,213,976 | Carlson | Sept. 10, 1940 |
| 2,234,326 | Tiebel | Mar. 11, 1941 |
| 2,257,757 | Moseley | Oct. 7, 1941 |
| 2,351,977 | Kronenberger et al. | June 20, 1944 |
| 2,415,429 | Kellogg et al. | Feb. 11, 1947 |